Aug. 13, 1929.  J. H. HOERN  1,724,282
MAKING POPPET VALVES
Filed Feb. 13, 1928
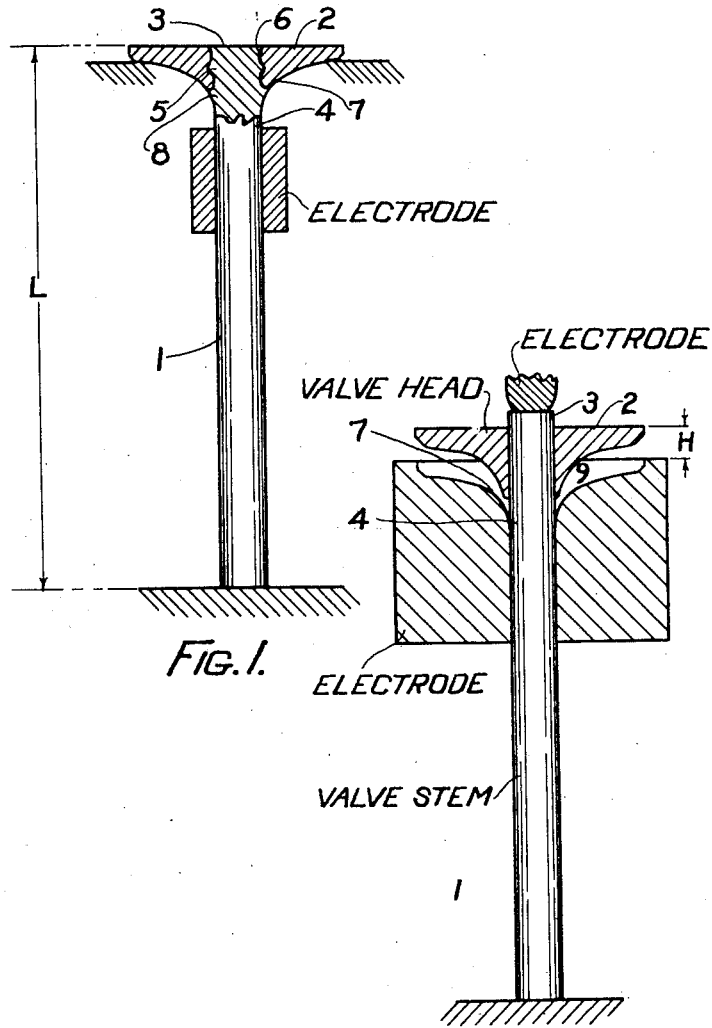
INVENTOR
JOSEPH H. HOERN
BY George B. Willcox
ATTORNEY Patented Aug. 13, 1929.

1,724,282

UNITED STATES PATENT OFFICE.

JOSEPH H. HOERN, OF SAGINAW, MICHIGAN, ASSIGNOR TO WILCOX-RICH CORPORATION, OF DETROIT, MICHIGAN, A CORPORATION OF MICHIGAN.

MAKING POPPET VALVES.

Application filed February 13, 1928. Serial No. 253,865.

This invention relates to making poppet valves, particularly to a novel method of welding a high-chrome stem to a head of the same or similar material.

The objects of the invention are, to provide a welded joint that extends the full length of the bore in the head, and possesses two novel characteristics, namely, peripheral ribs on the stem within the head and a shoulder on the stem at its juncture with the head, both the ribs and the shoulder welded to and forming integral parts of the head.

A further object is to provide a method of shaping the outer surface of the shoulder to form a smooth contour with the curved under surface of the valve head.

In the drawings Fig. 1 is a part sectional view of a valve, the location of a stem electrode being indicated thereon and also the location of stops for the end of the stem and the head.

Fig. 2 is a sectional detail of a head and the end of the stem as welded, showing the location of an end electrode.

Fig. 3 is a part sectional side view of a stem and head assembled in relation to the electrodes before welding.

With the foregoing objects in view, the method consists in making a poppet valve by first inserting a valve stem 1 in a bore formed in a valve head 2 in the usual way, and then passing a welding current through a certain part of the stem, viz, from its end 3 to a point 4 below the valve head, while simultaneously applying endwise pressure to and thereby compressing the heated end. This causes the heated metal near the end of the stem to flow into and mingle with the softened metal of the head around the bore, with the result that there are formed within the head itself at least one and sometimes two peripheral ribs on the stem. These ribs 5, 6 are pronounced in size and provide anchorages of utmost holding power that unite the stem 1 and head 2. In fact the ribs so formed are welded to and form integral parts of the head.

Furthermore, applying pressure to the end of the stem so compresses the heated portion of the stem just below the lower edge 7 of the head that it causes a peripheral shoulder 8 to be formed on the stem at the bottom 7 of the head. This is done by an upsetting action that requires a certain amount of metal to be displaced from the stem itself, and this flow of metal shortens the stem and causes the valve head to settle down a distance of, say, three-sixteenths of an inch, as indicated at H in Fig. 3.

This stem-shortening action is availed of to mold or shape the outer surface of the shoulder 8 while it is soft, by forcing it into a suitable form or mold 9, which may be, as shown, a part of one of the electrodes.

After being subjected to the method above described a bored valve head and a plain cylindrical valve stem merge as a valve with integral head and stem, the stem locked to the head by ribs on the stem that are fused within the head.

The finished valve is further characterized by an external shoulder or fillet that is formed on the stem and blends into the contour of the lower part of the head and is welded integrally thereto.

By placing the lower electrode in contact with stem 1 at a point below the head, the part of the stem between the electrode and the head is brought to welding heat and forms the external shoulder, while all of that part of the stem within the bore of the head is also heated, resulting in what is termed a one hundred per cent head, or a head in which the effective heat zone extends clear through the head.

Having thus described my invention, what I claim and desire to secure by Letters Patent is:

Making a poppet valve by inserting a valve stem in a close fitting cylindrical bore formed in a valve head, passing a welding current through the stem from its end to a point below the head and simultaneously applying pressure to the said end while at welding temperature, thereby compressing and upsetting the stem at a point thereon below the head to form from that part of the material of the stem which is immediately below the head an upset shoulder on the stem at the juncture thereof with the head, and welding said shoulder to the lower part of the head.

In testimony whereof, I affix my signature.

JOSEPH H. HOERN.